United States Patent
Kim et al.

(10) Patent No.: US 11,843,280 B2
(45) Date of Patent: Dec. 12, 2023

(54) MOTOR INCLUDING WOUND COIL AND METHOD OF MANUFACTURING THE SAME

(71) Applicant: HYUNDAI MOBIS CO., LTD., Seoul (KR)

(72) Inventors: Yong Ho Kim, Seoul (KR); Jae Woo Jung, Yongin-si (KR); Min Mo Koo, Sejong-si (KR); Ju Seong Yu, Yongin-si (KR); Jin Woo Choi, Seoul (KR); Joon Hyung Kim, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 9 days.

(21) Appl. No.: 17/215,878

(22) Filed: Mar. 29, 2021

(65) Prior Publication Data

US 2021/0305856 A1 Sep. 30, 2021

(30) Foreign Application Priority Data

Mar. 30, 2020 (KR) .................. 10-2020-0038516

(51) Int. Cl.
*H02K 1/16* (2006.01)
*H02K 3/12* (2006.01)
(Continued)

(52) U.S. Cl.
CPC ............... *H02K 1/165* (2013.01); *H02K 3/12* (2013.01); *H02K 3/48* (2013.01); *H02K 15/026* (2013.01); *H02K 15/065* (2013.01)

(58) Field of Classification Search
CPC ...... H02K 15/064; H02K 3/12; H02K 15/024; H02K 1/165; H02K 15/026; H02K 3/48; H02K 15/065

See application file for complete search history.

(56) References Cited

U.S. PATENT DOCUMENTS 3,257,572 A * 6/1966 Heilmann .............. H02K 17/12
310/216.099
10,110,076 B2 * 10/2018 Li ........................... H02K 1/16
(Continued)

FOREIGN PATENT DOCUMENTS

CN 107070034 A 8/2017
DE 102 36 942 A1 3/2004
(Continued)

OTHER PUBLICATIONS

Office Action issued in corresponding German Patent Application No. 102021107812.1 dated Jan. 10, 2022.
(Continued)

*Primary Examiner* — Leda T Pham
(74) *Attorney, Agent, or Firm* — Morgan, Lewis & Bockius LLP

(57) ABSTRACT

A motor including a wound coil includes: a stator core, a cross-section of which has a ring-shape, extending in a longitudinal direction of the motor, the stator core including a plurality of teeth in the stator core, the plurality of teeth are spaced apart from each other in a circumferential direction of the stator core, and a plurality of slots arranged between the plurality of teeth; a coil extending in a longitudinal direction of the stator core and extends into the plurality of slots; and a coupling core, which includes shoes coupled to inner ends of the plurality of teeth and which is disposed inside the stator core so as to be integrally coupled to the stator core.

20 Claims, 8 Drawing Sheets

(51) Int. Cl.
  *H02K 15/06*  (2006.01)
  *H02K 15/02*  (2006.01)
  *H02K 3/48*  (2006.01)

(56) References Cited

U.S. PATENT DOCUMENTS

| | | | |
|---|---|---|---|
| 2004/0075359 A1* | 4/2004 | Muller | H02K 1/148 |
| | | | 310/216.008 |
| 2006/0279160 A1 | 12/2006 | Yoshinaga et al. | |
| 2007/0290567 A1* | 12/2007 | Adaniya | H02K 1/148 |
| | | | 310/216.004 |
| 2011/0309711 A1* | 12/2011 | Brown | H02K 1/148 |
| | | | 310/216.007 |
| 2017/0317565 A1* | 11/2017 | Hatch | H02K 15/066 |

FOREIGN PATENT DOCUMENTS

| | | |
|---|---|---|
| DE | 103 55 618 A1 | 6/2004 |
| GB | 932708 A | 7/1963 |
| JP | 2013-017271 A | 1/2013 |
| KR | 10-2018-0028767 A | 3/2018 |

OTHER PUBLICATIONS

Dobroschke, Andreas, "Flexible Automatisierungslösungen für die Fertigung wickeltechnischer Produkte," Bamberg : Meisenbach Verlag, 2011 (Fertigungstechnik-Erlangen; 219). S. 22-25.—ISBN 978-3-87525-317-7—Erlangen-Nürnberg, Univ., Diss., 2011.
Office Action issued in corresponding Chinese Patent Application No. 202110336161.8 dated Sep. 29, 2023, with English translation.

\* cited by examiner

MOTOR INCLUDING WOUND COIL AND METHOD OF MANUFACTURING THE SAME

CROSS-REFERENCE TO RELATED APPLICATION

This application claims the priority benefit of Korean Patent Application No. 10-2020-0038516, filed on Mar. 30, 2020 in the Korean Intellectual Property Office, the disclosure of which is incorporated herein by reference.

BACKGROUND OF THE INVENTION

1. Field of the Invention

The present invention relates to a motor including a wound coil and a method of manufacturing the same, and more particularly to a motor including a wound hairpin-type coil and a method of manufacturing the same.

2. Description of the Related Art

In order to meet international requirements for reduction of greenhouse gas emissions and improvement of fuel efficiency, research and development and practical realization of components associated with environment-friendly vehicles designed to generate drive force using an electric motor has been actively conducted in the field of automotive field.

Particularly, in order to realize reduction of weight and provision of sufficient internal space, technology for improving the space factor of a motor by applying a hairpin-type coil to a drive motor has been developed. In the case of application of a hairpin-type coil, although it is possible to obtain an effect of improving the efficiency and power density of a motor, there are difficulties in the manufacture and quality management thereof.

In the conventional technology, a drive motor is manufactured such that hairpins are prepared by shaping coils each having an angled cross-section into a "U" shape or a "V" shape, the hairpins are fitted into slots formed in the stator core of the motor, the ends of the hairpins are twisted, and the twisted ends of the hairpins are connected to each other through welding.

However, the conventional process has problems in which the procedure of winding the hairpins is complicated, a long time is taken for the manufacture, and the incidence of defects caused by poor welding is increased.

Although an approach to fit a wound coil into slots in a stator core has been attempted in an effort to overcome the problems, there is a problem in that the stator core interferes with shoes.

Details described as the background art are intended merely for the purpose of promoting the understanding of the background of the present invention and should not be construed as an acknowledgment of the prior art that is previously known to those of ordinary skill in the art.

SUMMARY OF THE INVENTION

Therefore, the present invention has been made in view of the above problems, and it is an object of the present invention to provide a motor including a hairpin-type coil, which is continuously wound around a stator core equipped with shoes, and a method of manufacturing the motor.

In accordance with an aspect of the present invention, the above and other objects can be accomplished by the provision of a motor including a wound coil including a stator core, which has a ring-shaped cross-section and extends in a longitudinal direction of the motor and which includes therein a plurality of teeth, which are spaced apart from each other in a circumferential direction of the stator core, and a plurality of slots defined between the plurality of teeth, a coil, which extends in a longitudinal direction of the stator core and is fitted into the plurality of slots, and a coupling core, which includes shoes coupled to inner ends of the plurality of teeth and which is positioned inside the stator core so as to be integrally coupled to the stator core.

A portion of the coil may extend to an outside of the stator core in the longitudinal direction of the stator core, and the coil may be fitted into the stator core such that the coil is bent at an outside of the stator core and extends into the same slot or an adjacent slot.

Each of the shoes of the coupling core may extend from an inner end of a corresponding tooth to insides of the slots.

The coupling core may include a plurality of shoes, which extend in the longitudinal direction of the stator core of the coupling core and are arranged in a circumferential direction of the coupling core.

Each of the plurality of shoes may be connected to an adjacent shoe in a partial region or an entire region thereof in the longitudinal direction of the stator core.

The coupling core may include a connector adapted to connect adjacent shoes to each other in a circumferential direction of the coupling core, the connector being depressed radially inwards or outwards so as to have a thickness smaller than that of the shoes.

The coupling core may include a plurality of shoes, which extend in the longitudinal direction of the stator core, the connector may be formed only in a partial region of a longitudinal boundary between adjacent shoes, among the plurality of shoes, and the adjacent shoes may be spaced apart from each other in a circumferential direction of the coupling core in the remaining region of the longitudinal boundary.

Each of the shoes may include a coupling protrusion, which projects toward a corresponding one of the plurality of teeth, and each of the plurality of teeth may include a coupling groove, which is depressed radially inwards, such that the coupling protrusion of the shoe is fitted into and coupled into the coupling groove in the tooth.

The coupling core may extend in the longitudinal direction of the stator core, and may be coupled to the stator core only in a partial region thereof in the longitudinal direction of the stator core.

The inner ends of the plurality of teeth may extend longer in a radially inward direction of the stator core in a region of the stator core in which the coupling core is not coupled to the stator core than in a remaining region of the stator core in which the coupling core is coupled to the stator core.

The coupling core may include a plurality of shoes, which are continuously arranged in a circumferential direction of the coupling core so as to define a ring shape.

In accordance with another aspect of the present invention, there is provided a method of manufacturing the motor including a wound coil including preparing the stator core including the plurality of teeth and the plurality of slots defined between the plurality of teeth, fitting the continuously wound coil into the plurality of slots in the stator core, and integrally coupling the coupling core in the stator core by coupling the shoes to the inner ends of the plurality of teeth.

In the integral coupling of the coupling core, the coupling core may be fitted into the stator core in the state in which the stator core and the coupling core have different temperatures.

Each of the shoes may include a coupling protrusion, which projects toward a corresponding one of the plurality of teeth, and each of the plurality of teeth may include a coupling groove, which is depressed radially inwards. In the integral coupling of the coupling core, the coupling protrusions of the shoes may be fitted into and coupled to the coupling grooves in the teeth in the state in which the stator core is heated or the coupling core is cooled.

In the fitting of the continuously wound coil, the continuously wound coil may be fitted into the plurality of slots in the state in which the stator core is heated.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
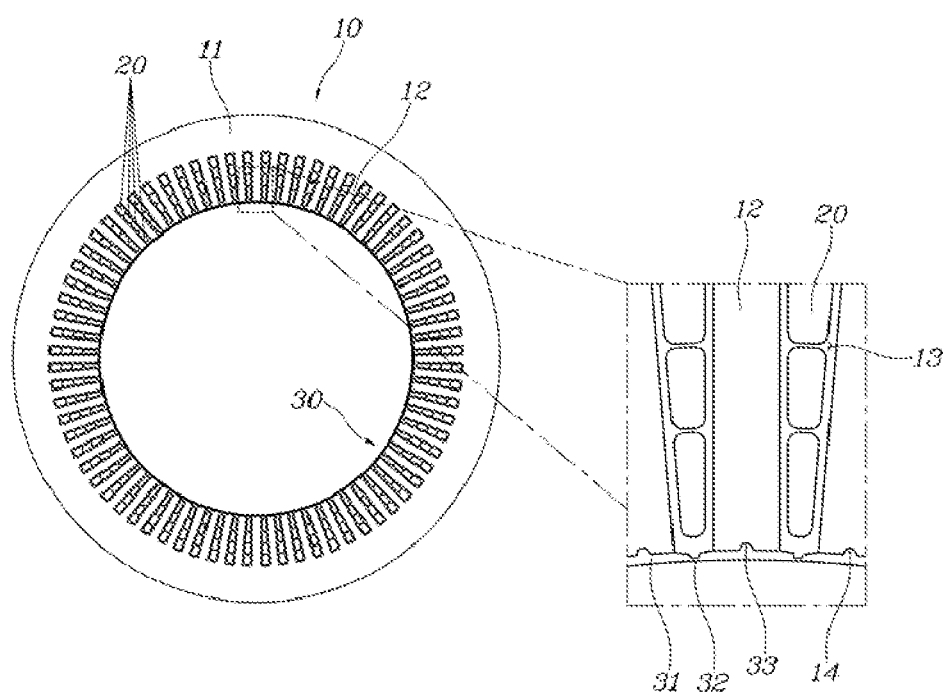
FIG. 1 is a cross-sectional view of a motor including a wound coil according to an embodiment of the present invention.
Figure 2:
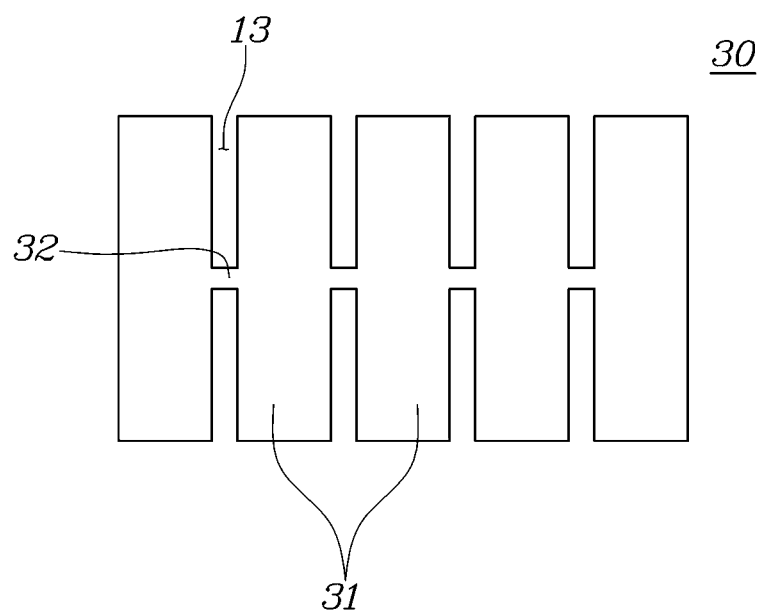
FIGS. 2 to 5 are views illustrating coupling cores in a spread state according to various embodiments of the present invention.

Specific structural and functional descriptions of embodiments of the present invention disclosed herein are only for illustrative purposes of the embodiments of the present invention. The present invention may be embodied in many different forms without departing from the spirit or significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be construed as being limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationships between elements, such as "between," "directly between," "adjacent to," or "directly adjacent to," should be understood in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which this invention belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Hereinafter, exemplary embodiments of the present invention will be described in detail with reference to the accompanying drawings. Throughout the drawings, the same reference numerals will refer to the same or like parts.

FIG. 1 is a cross-sectional view of a motor including a wound coil 20 according to an embodiment of the present invention.

Referring to FIG. 1, the motor including a wound coil 20 according to an embodiment of the present invention includes a stator core 10, which is configured to have a ring-shaped cross-section and to extend longitudinally and which includes therein a plurality of teeth 12, which are circumferentially spaced apart from each other so as to define a plurality of slots 13 between the plurality of teeth 12, a coil 20, which is disposed in the plurality of slots 13 and extends in the longitudinal direction of the stator core 10 so as to be wound around the stator core 10, and a coupling core 30, which includes shoes 31 coupled to the inner ends of the plurality of teeth 12 and which is disposed inside the stator core 10 and is integrally coupled to the stator core 10.

Although the motor including the wound coil 20 may be applied to a motor for driving a vehicle, the present invention is not limited thereto.

The stator core 10 refers to a stator core of the motor, in which the plurality of teeth 12 extend longitudinally along the inner side of a ring-shaped yoke 11. The plurality of teeth 12 may be arranged so as to be spaced apart from each other, and the slots 13 may be formed between the plurality of teeth 12.

In another embodiment, the stator core 10 may be constructed such that the yoke 11 formed at the outer sides of the teeth 12 are split into a plurality of yoke sectors. In other words, split-type stator cores 10 may be fitted between the coil 20 from the outside such that the coil 20 is wound around the stator core 10.

The teeth 12 coupled to the yokes 11 may be fitted between the coil 20 from the outside, whereby the distance between adjacent teeth 12 is decreased. A support ring may surround the outer surface of the stator core 10 in the state in which the split-type cores 10 are coupled to each other.

The coil 20 may be configured to have not only a circular cross-section but also an angled cross-section. In other words, the coil 20 may be a hairpin-type coil 20, which has a polygonal cross-section such as a rectangular cross-section and extends longitudinally.

The coil 20 may be fitted into the plurality of slots 13 in the state of extending in the longitudinal direction of the stator core 10 so as to be wound around the stator coil 10.

In a conventional technology, about 100 to 150 linear coil segments, each of which extends linearly, or about 100 to 150 hairpin coil segments, each of which is bent into a U shape (or a V shape), are fitted into a plurality of slots 13, and then the coil segments are twisted or welded, whereby the coil is wound around the stator core.

According to the present invention, hairpin-type coils 20, which are continuously connected to each other, are fitted into the slots 13 in the stator core 10 such that the coil 20 is wound around the stator core 10. Accordingly, it is possible to omit an additional process such as twisting or welding.

The coupling core 30 may include shoes 31, which are respectively coupled to the inner ends of the teeth 12 included in the stator core 10. Each of the shoes 31 may be coupled to the inner end of one of the teeth 12 and may extend circumferentially outwards from the corresponding tooth 12 to the inside of the slot 13.

Specifically, the coupling core 30 is manufactured separately from the stator core 10, the continuous coil 20 is inserted into the stator core 10, and the coupling core 30 is integrally coupled to the inner side of the stator core 10.

Accordingly, since the continuous coil is inserted into the stator core 10, it is possible to omit a welding process and thus to offer an effect of decreasing a defective fraction caused by poor welding.

Furthermore, since the coupling core 30 including the shoes 31 is inserted into the stator core 10, there are effects of improving performance of reducing NVH (noise, vibration and harshness) and of reducing torque ripple and cogging torque of a motor.

In addition, since the capacitance between a rotor core and the coil 20 is decreased, there is an effect of lowering the shaft voltage in a shaft coupled to the rotor core.

The coil 20 may be inserted into the stator core 10 such that a portion of the coil 20 extends to the outside of the stator core 10 in the longitudinal direction of the stator core 10 and such that the coil 20 is bent at the outside of the stator core 10 and continuously extends into the same slot 13 or an adjacent slot 13.

The coil 20 may extend in the longitudinal direction of the stator core 10 and then in upward and downward directions of the stator core 10. The coil 20 may be bent at the outer side of the stator core 10, and may extend into the same slot 13 or an adjacent slot 13.

The coil 20 may be wound around the stator core 10 in such a manner as to be fitted into a single slot 13 in the radial direction of the stator core 10 four times, six times or eight times and then to extend into an adjacent slot 13.

In other words, unlike a conventional technology, in which coil segments are fitted into the stator core 10 and are connected to each other through welding, the coil 20 according to the present invention may be fitted into the stator core 10 in the continuous state.

Each of the shoes 31 of the coupling core 30 may extend from the inner end of the tooth 12 to the inside of the slot 13.

Each shoe 31 may extend in the circumferential direction of the coupling core 30 or the stator core 10. In other words, the shoe 31 may extend in opposite circumferential directions from the inner end of the tooth 12 to the inside of the slot 13. Accordingly, the shoe 31 may extend into the slot 13, and may thus cover a portion of the inner side of the coil 20.

The coupling core 30 may include a plurality of shoes 31, which extend in the longitudinal direction of the stator core 10. The plurality of shoes 31 may be arranged in the circumferential direction of the coupling core 30.

In an embodiment, the coupling core 30 may be constructed such that a plurality of shoes 31 are continuously connected to each other so as to define a ring-shaped cross-section and to extend in the longitudinal direction of the stator core 10. The number of shoes 31 may be the same as the number of teeth 12 included in the stator core 10.

In another embodiment, a plurality of coupling cores 30 may be coupled to the stator core 10 in which each of the coupling cores 30 is composed of a plurality of shoes 31, which are connected to each other so as to define an arched cross-section. For easy coupling, a continuous ring-shaped coupling core may be divided into two or three coupling core sectors 30, and the coupling core sectors 30 may be coupled to the stator core 10.

FIGS. 2 to 5 are views illustrating coupling cores 30 in a spread state according to various embodiments of the present invention.

Specifically, FIGS. 2 to 5 are plan views illustrating the spread state of a coupling core 30, which is one of coupling core sectors prepared by longitudinally cutting an integral coupling core 30 or of a coupling core 30, which is originally manufactured so as to have an arched cross-section.

Referring again to FIGS. 2 to 5, adjacent shoes among the plurality of shoes 31 included in the coupling core 30 may be circumferentially connected to each other in a partial section or the entire section of the longitudinal boundary between the adjacent shoes 31.

As described later, each of the plurality of shoes 31 may be connected to an adjacent shoe 31 via a connector 32.

In an embodiment, adjacent shoes 31 may be connected to each other only in a partial section of the longitudinal boundary therebetween.

Figure 3:
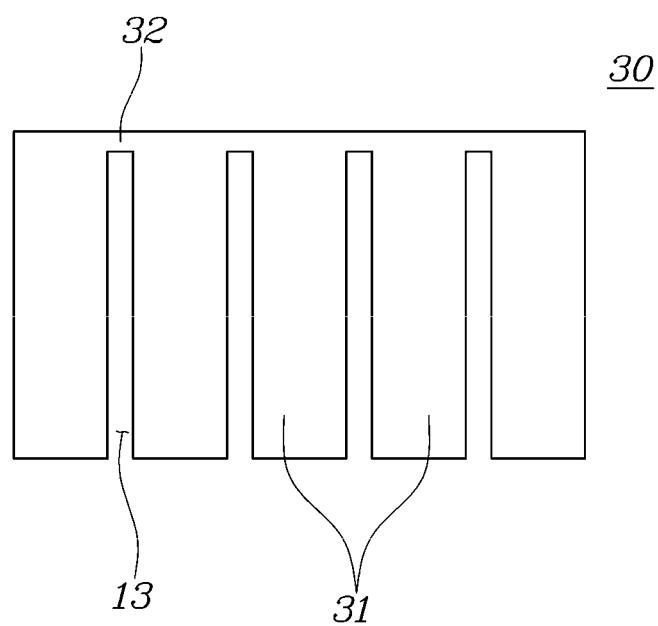
Figure 4:
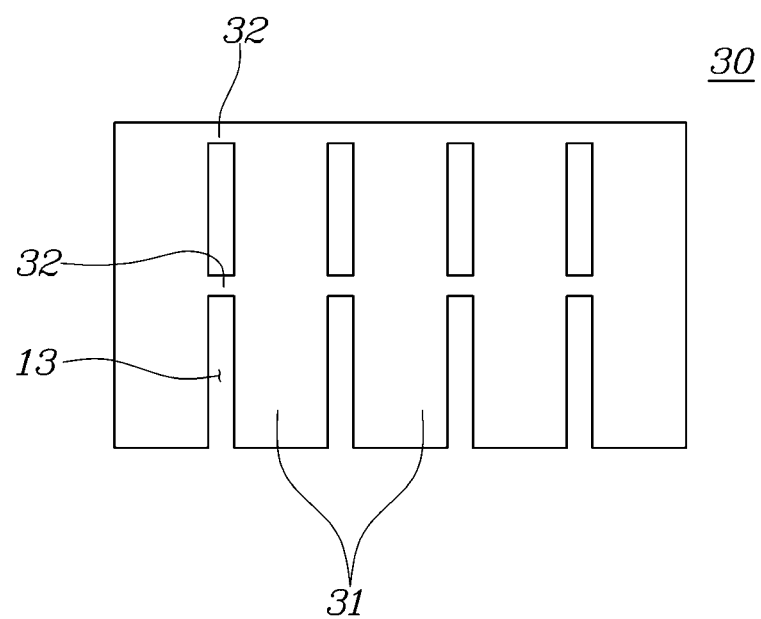
Figure 5:
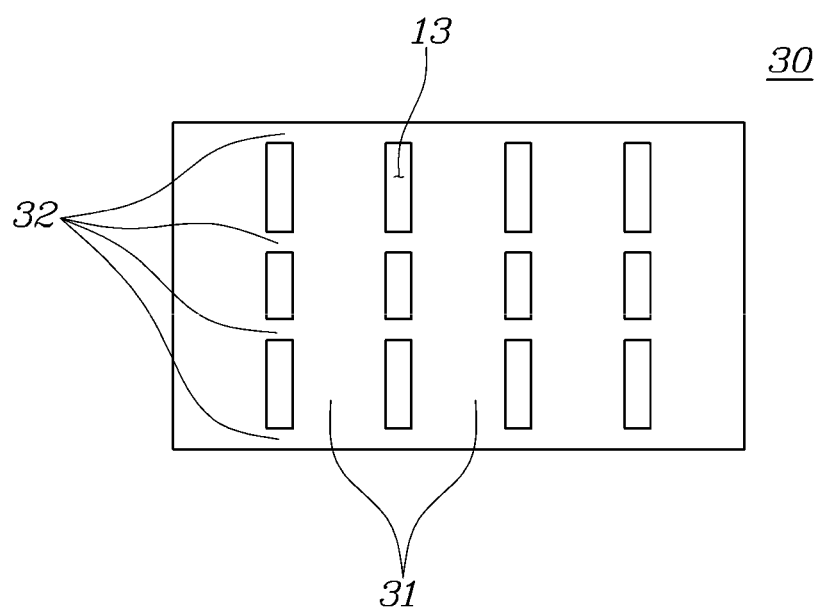

Specifically, as illustrated in FIGS. 2 to 5, adjacent shoes 31 may be connected to each other at the center of the longitudinal boundary therebetween (see FIG. 2), or at one end of the longitudinal boundary therebetween (see FIG. 3). Furthermore, adjacent shoes 31 may be connected to each other at the center and at one end of the longitudinal boundary therebetween (see FIG. 4), or at multiple points, that is, at one end, at the center, and at the other end of the longitudinal boundary therebetween (see FIG. 5).

In other words, since adjacent shoes 31 are connected to each other in a partial section of the longitudinal boundary therebetween, there is an effect of allowing the coupling core 30 to be easily coupled to the stator core 10. Furthermore, since the adjacent shoes 31 are separated from each other in the remaining section of the longitudinal boundary therebetween, there is an effect of reducing leakage of magnetic flux.

In another embodiment, adjacent shoes 31 may be connected to each other in the entire section of the longitudinal boundary therebetween.

The coupling core 30 may include the connectors 32, adapted to connect adjacent shoes 31 to each other in a circumferential direction of the coupling core. Each of the connectors 32 may be depressed radially inwards or outwards so as to have a thickness smaller than the shoe 31.

The connector 32 may be configured to have the form of a bridge connecting adjacent shoes 31 to each other and to cover the slot 13 between the teeth 12 coupled to the adjacent shoes 31 so as to close the space in the slot 13.

Particularly, the connector 32 may be depressed radially inwards from the outer surface thereof so as to have a thickness smaller than the shoe 31. Alternatively, the connector 32 may be depressed radially outwards from the inner surface thereof.

Accordingly, there is an effect of opening the region of the slot 13 that is shielded by the connector 32. The connector 32 may have a thickness as small as possible, as long as the connector 32 is capable of maintaining a desired rigidity, for example, a thickness of about 0.3-0.6 mm.

The coupling core 30 may include a plurality of shoes 31, which extend in the longitudinal direction of the stator core 10. The connector 32 may be formed only in a partial section of the longitudinal boundary between adjacent shoes 31 such that the adjacent shoes 31 are spaced apart from each other in the remaining section of the longitudinal boundary.

In other words, the connector 32 may connect adjacent shoes 31 at a portion such as one end or the center of the stator core 10 or the coupling core 30 such that the adjacent shoes 31 are spaced apart from each other at the remaining portion of the coupling core 30, as illustrated in FIGS. 2 to 5.

In an embodiment, the shoe 31 may be provided with a coupling protrusion 33, which projects toward the tooth 12, and the tooth 12 may be provided with a coupling groove 14, which is depressed radially inwards. Accordingly, the coupling protrusion 33 of the shoe 31 may be fitted into the coupling groove 14 in the tooth 12 and may be thus coupled thereto.

Specifically, each of the coupling protrusion 33 and the coupling groove 14 may be configured to have a semicircular or circular section. The coupling protrusion 33 may be fitted into and coupled into the coupling groove 14 in an interference-fitting manner or in a heat-shrink-fitting manner.

In another embodiment, the tooth 12 may be provided with the coupling protrusion 33, and the shoe 31 may be provided with the coupling groove 14. Accordingly, the coupling protrusion 33 on the tooth 12 may be fitted into and coupled to the coupling groove 14 in the shoe 31.

In a further embodiment, the shoe 31 and the tooth 12 may be coupled to each other through bonding using an adhesive or the like.

Figure 6:
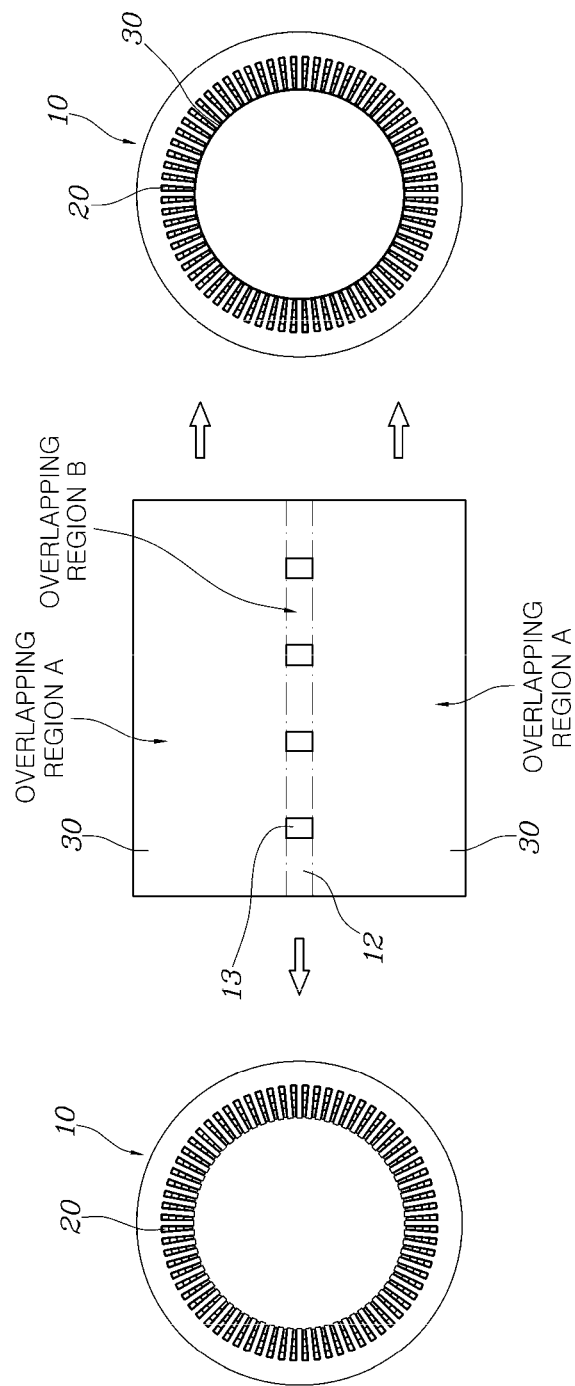
FIG. 6 is a plan view illustrating the state in which the stator core including the coupling core coupled thereto according to the present invention is spread into a flat shape.

FIG. 6 is a plan view illustrating the state in which the stator core 10 including the coupling core coupled thereto according to the present invention is spread into a flat shape.

Referring to FIG. 6, the coupling core 30 may extend in the longitudinal direction of the stator core 10, and may be coupled to the stator core 10 only in a partial region in the longitudinal direction of the stator core 10.

Specifically, as illustrated in FIG. 6, the coupling core 30 may be coupled to the inner side of the stator core 10 only in a partial region (an overlapping region A) in the longitudinal direction of the stator core 10, and may be separated therefrom in the remaining region (overlapping region B).

Because the coupling core 30 is not coupled to the stator core 10 in the overlapping region B, the shoes 31 are not coupled to the plurality of teeth 12 in the overlapping region B but are coupled to the plurality of teeth 12 only in the overlapping region A, with the result that adjacent shoes 31 are connected to each other via the connectors 32 in the overlapping region A.

The overlapping region A may be larger than the overlapping region B. For example, based on the length or the area of the inner circumferential surface of the stator core 10, the overlapping region A may be set to be 90% or higher, and the overlapping region B may be set to be 10% or lower.

Figure 7:
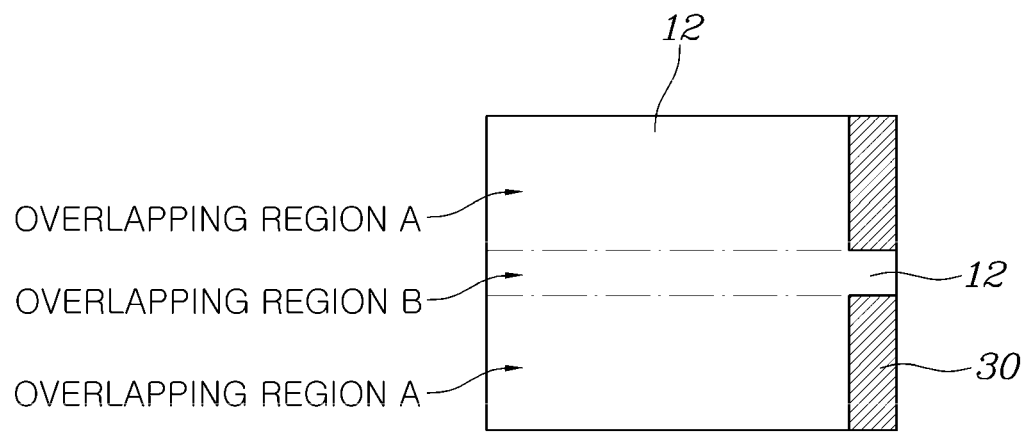
FIG. 7 is a cross-sectional view of the stator core including the coupling core coupled thereto according to an embodiment of the present invention.

FIG. 7 is a cross-sectional view of the stator core 10 including the coupling core coupled thereto according to an embodiment of the present invention.

Referring to FIG. 7, the inner end of the tooth 12 may extend longer in the inward direction of the stator core 10 in the region of the stator core 10 in which the coupling core 30 is not coupled to the stator core 10 than in the remaining region of the stator core 10, in which the coupling core 30 is coupled to the stator core 10.

Specifically, the inner end of the tooth 12 may extend longer radially inwards in the overlapping region B, in which the coupling core 30 is not coupled to the stator core 10, than in the overlapping region A.

Because the shoe 31 is coupled to the inner side of the tooth 12 in the overlapping region A, the inner side of the tooth 12 may extend further radially inwards to an extent corresponding to the thickness of the shoe 31 when the coupling core 30 is coupled to the stator core 10. Meanwhile, in the overlapping B in which the coupling core 30 is not coupled to the stator core 10, the inner end of the tooth 12 may extend further radially inwards to an extent corresponding to the thickness of the shoe 31.

Accordingly, the inner ends of the plurality of teeth 12 or the plurality of shoes 31 in the overlapping region A, in which the coupling core 30 is coupled to the stator core 10, and in the overlapping region B, in which the coupling core 30 is not coupled to the stator core 10, may the same radial distance from the center of the stator core 10.

In an embodiment, the coupling core 30 may be composed of a plurality of shoes 31, which are continuously arranged in the circumferential direction of the coupling core so as to define a ring shape, which is continuous in the circumferential direction of the coupling core.

Specifically, the coupling core 30 may be constructed such that a plurality of shoes 31 are continuously connected to each other in the circumferential direction of the coupling core and the two outermost shoes 31 are connected to each other so as to define a ring shape. Accordingly, the ring-shaped coupling core 30 may be fitted into the stator core 10 all at once.

In another embodiment, the coupling core 30 may be divided into a plurality of cores in the circumferential direction of the coupling core. In other words, each of the cores 30 may have an arched cross-section, which is a portion of a ring-shaped cross-section. The plurality of coupling cores 30 may be separately coupled to the stator core 10. The plurality of coupling cores 30 may be arranged on the stator cores 10 in the circumferential direction of the stator cores, and the facing ends of adjacent stator cores 10 may be connected to each other.

Figure 8:
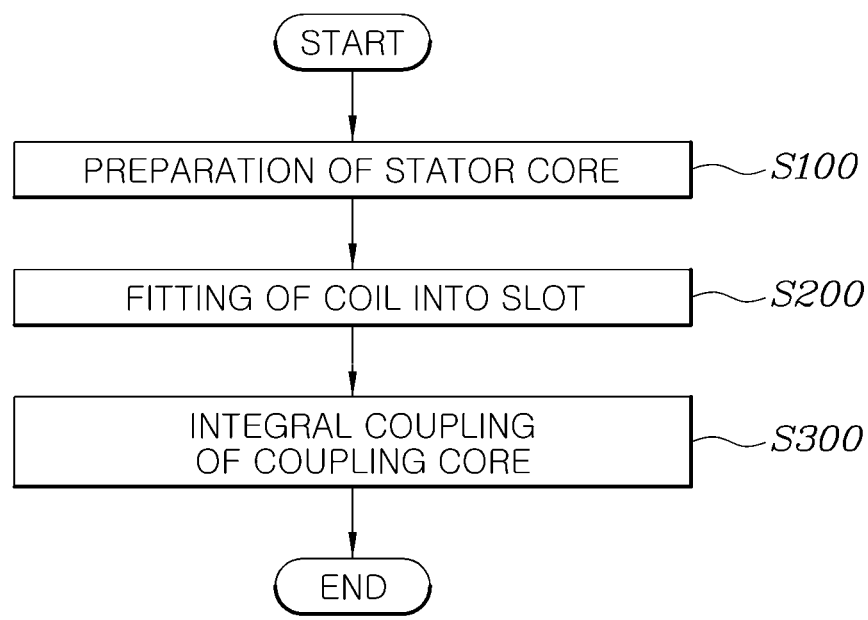
FIG. 8 is a flowchart illustrating a method of manufacturing the motor including a wound coil according to an embodiment of the present invention.

FIG. 8 is a flowchart illustrating a method of manufacturing the motor including a wound coil 20 according to an embodiment of the present invention.

Referring to FIG. 8, the method of manufacturing the motor including a wound coil 20 according to an embodiment of the present invention may include an operation (S100) of preparing the stator core 10 including a plurality of teeth 12 and a plurality of slots 13 defined between the plurality of teeth 12, an operation (S200) of fitting the continuously wound coil 20 into the plurality of slots 13, and an operation (S300) of integrally coupling the coupling core 30 to the inner side of the stator core 10 by coupling the shoes 31 to the inner ends of the teeth 12.

In the operation (S100) of preparing the stator core 10, the stator core 10 is formed through a separate process. At this time, the stator core 10 is formed such that a plurality of teeth 12 are formed in the inner circumferential surface of the yoke 11 so as to be spaced apart from each other in the circumferential direction of the stator core, thereby creating a plurality of slots 13 between the plurality of teeth 12. Here, the teeth 12 of the stator core 10 may not be provided with the shoes 31 individually extending in the circumferential direction of the stator core.

In the operation (S200) of fitting the coil 20, the continuously wound coil 20 may be fitted into the plurality of slots 13 in the stator core 10.

The coil 20, which extends in the longitudinal direction of the stator core, may be bent at the two ends of the stator core 10 and then extend in the opposite direction in a zigzag fashion. Here, the coil 20, which is of a hairpin type having a rectangular cross-section, may be fitted into the plurality of slots 13. In other words, the plurality of teeth 12 of the stator core 10 may be fitted into the wound coil 20 such that the coil 20 is wound around the stator core 10.

In the operation (S300) of integrally coupling the coupling core 30, the coupling core 30 may be coupled to the inner circumferential surface of the stator core 10 in the state in which the coil 20 is fitted into the plurality of slots 13.

Specifically, in the operation (S300) of integrally coupling the coupling core 30, the coupling core 30 may be fitted into the stator core 10 in the state in which the stator core 10 and the coupling core 30 have different temperatures.

The coupling core 30, in which adjacent shoes 31 are connected to each other so as to define a ring-shaped cross-section, may be fitted into the stator core 10 in the axial direction (the longitudinal direction). To this end, the stator core 10 and the coupling core 30 may be heated or cooled to different temperatures, and the coupling core 30 may be fitted into the stator core 10.

In an embodiment, the stator core 10, which is externally positioned, may be heated to a relatively high temperature, or the coupling core 30, which is internally positioned, may be cooled to a relatively low temperature.

Specifically, the coupling core 30 may be fitted into the stator core 10 in the longitudinal direction in the state in which the stator core 10 is heated and expanded, and then the stator core 10 may be cooled, thereby coupling the coupling core 30 to the stator core 10.

Alternatively, the coupling core 30 may be fitted into the stator core 10 in the longitudinal direction in the state in which the coupling core 30 is cooled and shrunk, and then the coupling core 30 may be heated, thereby coupling the coupling core 30 to the stator core 10.

Here, the stator core 10 and the coupling core 30 may be made of the same material, and may thus have the same coefficient of thermal expansion.

Specifically, the shoe 31 may be provided with the coupling protrusion 33, which projects toward the tooth 12, and the tooth 12 may be provided with the coupling groove 14, which is depressed radially inwards. In the operation (S300) of integrally coupling the coupling core 30, the coupling protrusion 33 of the shoe 31 may be fitted into the coupling groove 14 in the tooth 12 in the state in which the stator core 10 is heated or the coupling core 30 is cooled.

In the case in which the coupling core 30 is fitted into the stator core 10 in the state in which the stator core 10 is heated and expanded and the coupling core 30 is cooled and shrunk, the coupling groove 14 may be formed in the tooth 12 of the stator core 10, and the coupling protrusion 33 may be formed on the shoe 31 of the coupling core 30.

Accordingly, the coupling protrusion 33 may be easily fitted into the coupling groove 14 in the state in which the coupling groove 14 is expanded or in which the coupling protrusion 33 is shrunk. Subsequently, the stator core 10 may be cooled or the coupling core 30 may be heated, thereby preventing the coupling protrusion 33 from escaping from the coupling groove 14.

In the operation (S200) of fitting the coil 20, the continuously wound coil 20 may be fitted into the plurality of slots in the state in which the stator core 10 is heated.

Because the stator coil 20 is heated and expanded and the slots 13 defined between the plurality of teeth 12 are thus expanded, the wound coil 20 may be easily fitted into the slots 13.

In another embodiment, the coil 20 may also be fitted into the slots 13 so as to be wound around the stator core 10 in the state in which the coil 20 is cooled and shrunk.

In a further embodiment, in the operation (S100) of preparing the stator core 10, a split-type stator core 10, in which the plurality of teeth 12 and the yoke 11 coupled to the outer surfaces of the plurality of teeth 12 are split into a plurality of stator core sectors, may be prepared, and the plurality of stator core sectors 10 may be arranged in the circumferential direction of the stator core, thereby completing the stator core 10.

In the operation (S200) of fitting the coil 20, the coil 20 may be fitted into the plurality of slots 13 defined between the plurality of teeth 12 by fitting the split-type stator core 10 into the coil 20 from the outside of the coil 20.

As is apparent from the above description, in the motor including a wound motor and the method of manufacturing the same according to the present invention, since the continuously wound coil is fitted into the stator core, it is possible to omit a welding process and thus to convey an effect of decreasing a defective fraction caused by poor welding.

Furthermore, since the coupling core including the shoes is inserted into the stator core, there are effects of improving performance of reducing NVH (noise, vibration and harshness) and of reducing torque ripple and cogging torque of the motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A motor including a wound coil comprising:
a stator core, a cross-section of which has a ring shape, extending in a longitudinal direction of the motor and including a plurality of teeth inside the stator core, wherein the plurality of teeth are spaced apart from each other in a circumferential direction of the stator core and comprise a plurality of slots respectively arranged between the plurality of teeth;

a coil, which extends through the plurality of slots in a longitudinal direction of the stator core; and a coupling core including shoes coupled to inner ends of the plurality of teeth, respectively, wherein the coupling core is disposed inside to be integrally coupled the stator core, wherein each of the plurality of slots and a connector are arranged in the longitudinal direction of the motor, and wherein the coupling core is coupled to the stator core in one region of the stator core and is separated from the stator core in another region of the stator core, the one region and the another region being arranged in the longitudinal direction of the motor.

2. The motor according to claim 1, wherein a portion of the coil extends to an outside of the stator core in the longitudinal direction of the stator core and the coil extends through the stator core, such that the coil has a configuration of being bent at an outside of the stator core from one slot among the plurality of slots and extends into the same slot or an adjacent slot.

3. The motor according to claim 1, wherein each of the shoes of the coupling core extends from an inner end of a corresponding tooth to an inside of a corresponding slot.

4. The motor according to claim 1, wherein the shoes extend in the longitudinal direction of the stator core and are arranged in a circumferential direction of the coupling core.

5. The motor according to claim 4, wherein each of the plurality of shoes is connected to an adjacent shoe in a partial region or an entire region of the adjacent shoe in the longitudinal direction of the stator core.

6. The motor according to claim 1, wherein the connector is configured to connect adjacent shoes to each other in a circumferential direction of the coupling core and to be depressed radially inwards so as to have a thickness smaller than a thickness of the shoes.

7. The motor according to claim 6, wherein the shoes extend in the longitudinal direction of the stator core, and wherein the connector is disposed in a partial region of a longitudinal boundary between adjacent shoes, among the plurality of shoes, and the adjacent shoes are spaced apart from each other in the circumferential direction of the coupling core in a remaining region of the longitudinal boundary.

8. The motor according to claim 1, wherein each of the shoes includes a coupling protrusion extending towards a corresponding one of the plurality of teeth, and wherein each of the plurality of teeth includes a coupling groove is depressed radially inwards such that the coupling protrusion extends through to be coupled to the respective coupling groove.

9. The motor according to claim 1, wherein the coupling core extends in the longitudinal direction of the stator core and is coupled to the stator core in a partial region of the stator core in the longitudinal direction of the stator core.

10. The motor according to claim 9, wherein the inner ends of the plurality of teeth extend longer in a radially inward direction of the stator core in a region of the stator core in which the coupling core is not coupled to the stator core than in a remaining region of the stator core, in which the coupling core is coupled to the stator core.

11. The motor according to claim 1, wherein the shoes of the coupling core are continuously arranged in a circumferential direction of the coupling core in a ring shape.

12. A method of manufacturing the motor of claim 1, the method comprising:

preparing the stator core including the plurality of teeth and the plurality of slots arranged between the plurality of teeth;

continuously winding the coil to fit into the plurality of slots in the stator core; and integrally coupling the coupling core in the stator core by coupling the shoes to the inner ends of the plurality of teeth.

13. The method according to claim 12, wherein, in the integral coupling of the coupling core, the coupling core is fitted into the stator core in a state in which the stator core and the coupling core have different temperatures.

14. The method according to claim 13, wherein each of the shoes include a coupling protrusion, which protrudes toward a corresponding one of the plurality of teeth, and each of the plurality of teeth includes a coupling groove, which is depressed radially inwards, and wherein, in the integral coupling of the coupling core, the coupling protrusions of the shoes are extended to be coupled to the coupling grooves, respectively, in a state in which the stator core is heated or the coupling core is cooled.

15. The method according to claim 12, wherein, in the continuously winding the coil to fit into the plurality of slots, the continuously wound coil is fitted into the plurality of slots in a state in which the stator core is heated.

16. The motor according to claim 1, wherein the shoes are connected to each other by the connector disposed at a center of a longitudinal boundary of the shoes.

17. The motor according to claim 1, wherein the shoes are connected to each other by the connector disposed at one end of a longitudinal boundary of the shoes.

18. The motor according to claim 1, wherein the shoes are connected to each other by the connector disposed at a center and at one end of a longitudinal boundary of the shoes.

19. The motor according to claim 1, wherein the shoes are connected to each other by the connector disposed at one end, at a center, and at another end of a longitudinal boundary of the shoes.

20. The motor according to claim 1, wherein the connector is configured to connect adjacent shoes to each other in a circumferential direction of the coupling core and to be depressed radially outwards so as to have a thickness smaller than a thickness of the shoes.

\* \* \* \* \*